Figure 1:
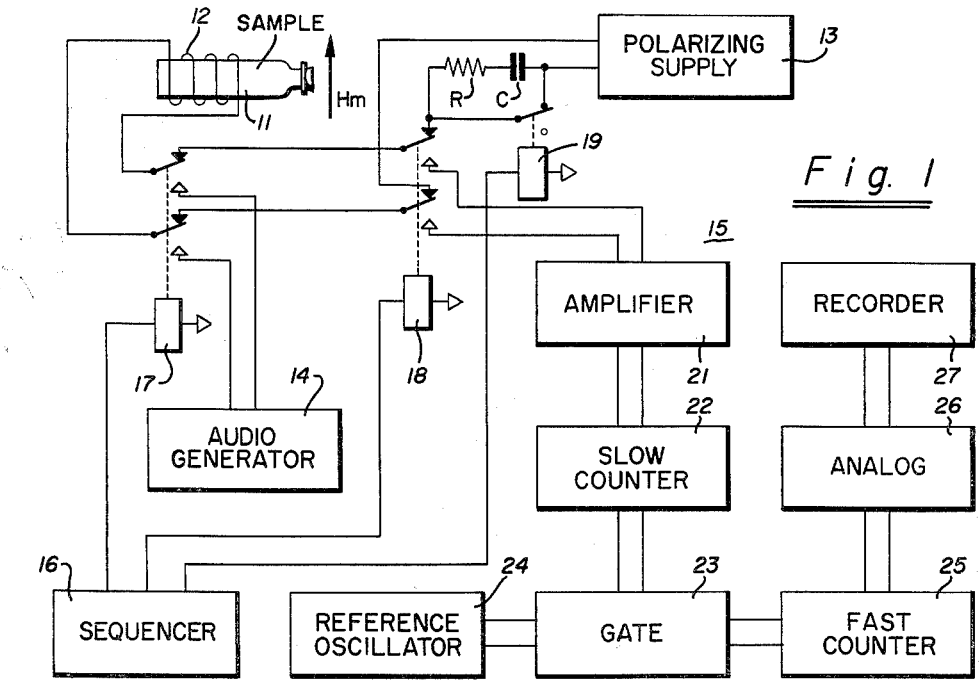

March 13, 1962     A. L. BLOOM     3,025,457

ATOMIC FREE PRECESSION METHODS AND APPARATUS

Filed Jan. 7, 1957

INVENTOR.
Arnold L. Bloom
BY
*Paul B. Hunter*
Attorney

United States Patent Office 3,025,457
Patented Mar. 13, 1962

3,025,457
ATOMIC FREE PRECESSION METHODS AND APPARATUS
Arnold L. Bloom, Los Altos, Calif., assignor to Varian Associates, San Carlos, Calif., a corporation of California
Filed Jan. 7, 1957, Ser. No. 632,818
11 Claims. (Cl. 324—0.5)

This invention relates in general to the art of gyromagnetic resonance and relates more particularly to a novel, improved method and apparatus for producing free precessions of gyromagnetic atom portions in magnetic fields.

There is first disclosed in U.S. Patent Re. 23,769 entitled "Method and Means for Correlating Nuclear Properties of Atoms and Magnetic Fields," issued January 12, 1954, a basic method and apparatus for producing and detecting free precessions in magnetic fields of gyromagnetic atom portions possessing the properties of magnetic moment and gyroscopic moment. There is described therein the procedure for locating a sample of matter containing gyromagnetic atom portions, for example, water containing protons, in a magnetic field which one desires to measure, for example, the earth's magnetic field. A relatively strong polarizing magnetic field is then applied to the sample at an angle, preferably but not necessarily 90°, to the earth's magnetic field, the magnetic moments of the protons thus being polarized in the direction of the applied strong magnetic field. After polarization, the magnetic field is suddenly turned off and the protons left to precess freely in the earth's magnetic field. The polarized proton magnetic moments then freely precess about the earth's magnetic field in a coherent manner for a short period and induce a voltage in a receiver coil positioned at an angle preferably normal to the earth's field and inductively coupled to the sample. The signal induced in the receiver coil will be of the precessional frequency of the precessing magnetic moments which, in accordance with well-known laws of nuclear resonance, will be equal to the Larmor frequency of the protons which is directly proportional to the strength of the magnetic field in which the protons are precessing, in this case the earth's magnetic field. By measuring the exact frequency of the alternating frequency signal from the pickup coil, the exact strength of the earth's magnetic field may be determined. Thus, the method and apparatus of the U.S. Patent Re. 23,769 is particularly adapted to the measurement of magnetic fields such as the earth's magnetic field.

The novel method and apparatus disclosed herein describes another method and apparatus for producing the free precessions of the atom portions. In this new method the atom portions, assumed to be protons in water, are located in the unknown magnetic field, assumed to be the earth's magnetic field, and a stronger polarizing magnetic field applied to the protons as before. This polarizing field may be at an angle (such as normal) to the earth's field or it may be in alignment with the earth's field. If it is at an angle to the earth's magnetic field, after polarization of the protons, the polarizing field is turned off slowly, over a period of from 50 to 100 milliseconds, for example. This slow turnoff of the polarizing field causes the magnetic moments of the protons to follow the total magnetic field vector (the vector sum of the polarizing magnetic field and the earth's magnetic field) and these protons end up polarized in the direction of the earth's magnetic field. Of course, if the polarizing magnetic field had been applied in the direction of the earth's magnetic field, when it is turned off the nuclei remain aligned in the earth's magnetic field and no slow decay of the field is necessary. In any case, by either method the protons are aligned in the direction of the earth's magnetic field.

To instigate free precession of the polarized moments, a pulse of alternating frequency energy, which is at the Larmor frequency of the protons in the earth's magnetic field, is applied to the proton moments at an angle to the direction of the earth's magnetic field. This may be accomplished by means of an electrical coil coupled to the water sample and positioned so as to produce a magnetic field normal to the earth's field or at a substantial angle thereto. The magnetic field produced at the sample by this alternating frequency applied energy is applied for a time just sufficient to rotate or tip the proton magnetic moments from alignment with the earth's field to an angle substantially normal thereto. If this applied alternating magnetic field is defined as $2H_1 \cos \omega t$ then the time length of the pulse, $t_w$, is given by $$\gamma H_1 t_w = \frac{\pi}{2}$$

leading to the expression $$t_w = \frac{\pi}{2\gamma H_1}$$

where $H_1$ is the strength of the applied A.C. magnetic field and $\gamma$ is the gyromagnetic ratio of the protons in the earth's field. In practice, this time may be of the order of 50 milliseconds. This A.C. magnetic field pulse is just sufficient to tip the nuclei approximately normal to the earth's magnetic field and, on termination of this applied alternating frequency energy, the nuclei will precess freely about the earth's magnetic field. The alternating magnetic field produced by these precessing moments may then be picked up by the same electrical coil and transmitted to a frequency counting system in the same manner as in the above cited U.S. patent. The frequency of this free precession signal is determined and, due to the direct relationship between frequency and field strength, serves as an accurate measurement of the strength of the earth's magnetic field.

The object of the present invention is to provide a new and novel method and apparatus for initiating the free precession of portions of atoms possessing gyromagnetic properties in magnetic fields.

One feature of the present invention is the provision of a novel method and apparatus for utilizing alternating frequency pulse means for initiating free precessions of atom portions in magnetic fields.

Another feature of the present invention is the provision of a novel method and apparatus for producing polarization of the magnetic moments of atom portions in the direction of a magnetic field to be measured and applying an alternating frequency pulse at an angle to this direction to cause the polarized atom portions to be reoriented at an angle to the unknown magnetic field direction, removal of the pulse allowing the atom portions to freely precess in the unknown magnetic field at an angle thereto, the precessions being at the Larmor frequency of the atom portions in the unknown magnetic field, such frequency of precession being measured to accurately determine the strength of the unknown magnetic field.

Figure 2:
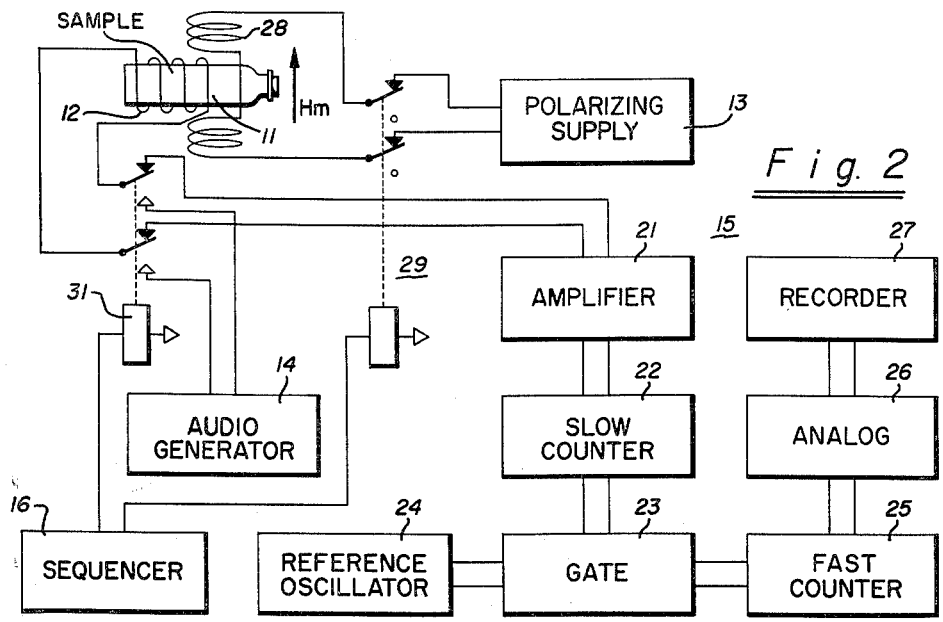

These and other features and advantages of the present invention will become more evident upon a perusal of the following specification taken in connection with the accompanying drawings wherein, FIG. 1 is a block diagram of one novel mode of operation of the present invention, and FIG. 2 is a block diagram of another mode of operation of the present invention. Like components in the two figures bear similar reference numerals.

Referring now to FIG. 1 there is provided a sample of matter containing the atom portions which possess the gyromagnetic properties of magnetic moment and gyroscopic moment. For the purpose of explaining this embodiment of the invention we will assume that the sample is water and that the atom portions of interest are the protons in the water. This sample of water is held in a suitable container, for example, a glass bottle 11 or the like and is positioned in a unidirectional magnetic field $H_m$ in which one desires to have the moments of the protons freely precess. Since one particularly advantageous use of the present invention is in the measurement of the strength of an unknown magnetic field, we will assume that the magnetic field $H_m$ is the earth's magnetic field which one desires to measure. An electrical coil 12 is wound about the sample and so positioned in the earth's magnetic field that any magnetic field produced by a current in the coil will be at an angle to the earth's magnetic field $H_m$, preferably normal thereto. In the present embodiment this coil will serve a threefold purpose; first to apply the strong polarizing magnetic field to the proton moments, second to apply the alternating frequency tipping pulse of magnetic field to the polarized proton magnetic moments, and third to detect the alternating magnetic field produced by the magnetic moments precessing freely in the earth's magnetic field. To accomplish this threefold purpose it is necessary that this single coil of wire 12 be switched from a polarizing current source 13 to an alternating frequency pulse source 14 and thence to a frequency counting system 15 and for this purpose a sequencer 16 and associated relay switching circuits are provided. This sequencer 16 may be a cam controlled switching means, electronic vacuum tube switching means, or any other conventional circuitry as desired.

At the start of the necessary sequence of operation, the relays 17, 18 and 19 are in the de-energized state at which time the source 13 of unidirectional polarizing current is coupled directly to the coil 12. This unidirectional current in the coil 12 results in a strong unidirectional magnetic field applied to the protons. The magnetic moments of the protons are thus aligned substantially in the direction of this unidirectional magnetic field which, because of the orientation of the coil normal to the earth's magnetic field $H_m$, is substantially normal to the earth's field. After a time sufficient to produce the polarization, the relay 19 operates to place an R-C circuit between the polarizing supply 13 and the coil 12. This R-C network produces a slow decay of the current in the coil 12 and thus a slow decay of the polarizing field to zero. The polarized magnetic moments of the protons follow the decaying total field component and thus rotate or tip toward the direction of the earth's field. At the end of the decay, the protons are polarized in the earth's magnetic field direction. At this instant of time, the coil 12 is switched by means of relay 17 from the polarizing supply 13 to the alternating frequency generator 14. The alternating frequency signal from this generator 14 has a frequency value equal to the Larmor frequency of the proton magnetic moments in the earth's magnetic field, approximately 2129 cycles per second. Since the exact strength of the earth's magnetic field is not known, the frequency of the source is only approximately the Larmor frequency of the protons but this is sufficient to produce the necessary reorientation of the magnetic moments. The alternating frequency from the generator 14 is applied to the coil for approximately a time period which is determined by the formula $$t_w = \frac{\pi}{2\gamma H_1}$$

where $H_1$ is the strength of the alternating magnetic field and $\gamma$ is the gyromagnetic ratio. For protons in the earth's magnetic field which is approximately .5 gauss, a typical time length for this pulse may be approximately 50 milliseconds. This alternating magnetic field applied normal to the polarized proton moments for this time period tips the moments through an angle which is approximately 90° relative to the direction of the earth's magnetic field. After this time $t_w$, the relay 17 releases and relay 18 closes to remove the alternating frequency signal from the coil 12 and to switch the coil 12 through to an associated frequency counting circuit 15. At this time the protons are aligned substantially normal to the earth's magnetic field and, upon removal of the alternating frequency magnetic field, the protons are free to precess in the earth's magnetic field. The precessing magnetic moments induce a voltage in the coil which is transmitted to an amplifier 21 where it is amplified and then transmitted to a counter system for counting the exact frequency of the free precessions. This counter system may comprise a slow counter electronic unit 22 which counts a particular number of cycles of the free precession signal, for example 512 cycles. During the period slow counter unit is counting this particular number of cycles, gate circuit 23 is triggered to allow a radio frequency signal from a standard radio frequency source 24, for example, 100 kc., to pass to a fast counter system 25 which counts the exact number of cycles of this R.F. signal which occur during the 512 cycles of the free precession signal. The count on the fast counter circuit is an accurate measurement of the frequency of the free precession signal and thus the strength of the earth's magnetic field. It is transmitted to an analog circuit 26 and to a recorder 27 for permanent recording. This frequency counting system may be identical to that disclosed in Patent Re. 23,769 and a more detailed descripton of this circuit may be found in the earlier patent.

Referring now to FIG. 2 there is shown another embodiment of the present invention in which the polarizing magnetic field is applied to the protons in the water in the same direction as the earth's magnetic field $H_m$. A separate coil 28 is used for polarizing the water protons and is coupled through a relay switching circuit 29 to the polarizing supply. No decay circuit is needed in this coupling circuit since the magnetic moments of the protons are initially polarized in alignment with the earth's magnetic field. After termination of the polarizing field to the coil 28 by release of relay 29, the relay 31 operates to connect the alternating frequency generator 14 to the second coil 12 oriented normal to the earth's magnetic field. The second coil 12 serves the dual purpose of applying the pulse of alternating magnetic field to the water to tip the magnetic moments of the protons away from the earth's field direction and also to detect the free precession signal due to the free precessing proton magnetic moments after termination of said pulse. The remainder of the amplifying and counter circuitry 15 is the same as for FIG. 1 and no further explanation of this circuit is deemed necessary with relation to the embodiment of FIG. 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for producing precession of atom portions possessing the properties of magnetic moment and gyroscopic moment in the earth's magnetic field in which said atom portions are located which comprises means for applying a pulse of second unidirectional magnetic field stronger than said earth's magnetic field to said atom portions to polarize said atom portions, said atom portions remaining polarized in the direction of said earth's magnetic field after removal of said polarizing magnetic field, means for applying an alternating magnetic field to said aligned atom portions substantially of the Larmor frequency of said atom portions in said earth's magnetic field and at an angle to the direction of said earth's magnetic field of sufficient time duration to rotate said atom portions from alignment with said earth's magnetic field, and means for detecting the magnetic field produced by said precessing atom portions in said earth's magnetic field after termination of said applied alternating magnetic field.

2. Apparatus as claimed in claim 1 wherein said detecting means comprises a frequency counting circuit for counting the frequency of the precessions.

3. Apparatus as claimed in claim 1 wherein said means for applying the polarizing pulse, the means for applying the alternating field pulse and the means for detecting the precessing magnetic field comprise at least one electrical coil coupled to said protons.

4. Apparatus for producing precession of portions of atoms possessing the properties of magnetic moment and gyroscopic moment in a first unidirectional magnetic field comprising means for applying a second unidirectional magnetic field to the atom portions stronger than and at an angle to the first magnetic field to thereby polarize the atom portions in the direction of said second magnetic field and for slowly decaying said second magnetic field to leave said atom portions polarized in said first magnetic field, means for applying an alternating magnetic field to said atom portions substantially of the Larmor frequency of said atom portions in said first magnetic field and at an angle to said first magnetic field to thereby tip said atom portions from alignment in said first magnetic field and for removing said alternating magnetic field to thereby allow said atom portions to precess freely in said first magnetic field, and means for detecting the rotating magnetic field produced by the precessing atom portions.

5. Apparatus as claimed in claim 4 wherein said means for applying said second magnetic field and said means for applying said alternating magnetic field and said means for detecting the rotating magnetic field include at least one electrical coil inductively coupled to said atom portions.

6. Apparatus as claimed in claim 4 wherein said means for detecting the rotating magnetic field includes a frequency counting system for counting the frequency of precession of the atom portions.

7. Apparatus as claimed in claim 4 wherein said means for applying said second unidirectional magnetic field comprises an electrical coil coupled to said atom portions, a direct current energy source adapted to be coupled to said coil and an impedance circuit for coupling in the D.C. source circuit for decaying the current flow in said coil.

8. Apparatus for producing precession of portions of atoms possessing the properties of magnetic moment and gyroscopic moment in the earth's magnetic field comprising means for applying a second unidirectional magnetic field to the atom portions stronger than and aligned with the earth's magnetic field to thereby polarize the atom portions in the direction of said earth's field and for removing said second magnetic field to leave said atom portions aligned in said earth's magnetic field, means for applying an alternating magnetic field to said atom portions of the Larmor frequency of said atom portions in said earth's magnetic field and at an angle to said earth's magnetic field to thereby tip said atom portions from alignment in said earth's magnetic field and for removing said alternating magnetic field to thereby allow said atom portions to precess freely in said earth's magnetic field, and means for detecting the rotating magnetic field produced by the precessing atom portions.

9. Apparatus as claimed in claim 8 wherein said means for applying said second unidirectional magnetic field comprises a first electrical coil coupled to said atom portions and wherein said means for applying said alternating magnetic field comprises a second electrical coil coupled to said atom portions.

10. Apparatus for producing precession of atom portions possessing the properties of magnetic moment and gyroscopic moment in the earth's magnetic field in which said atom portions are located and which comprises electromagnetic means for producing a magnetic field to align said atom portions in the direction of said earth's unidirectional magnetic field and for then removing said aligning magnetic field, means for applying an alternating magnetic field to said aligned atom portions substantially of the Larmor frequency of said atom portions in said earth's magnetic field and at an angle to the direction of said earth's magnetic field of sufficient time duration to rotate said atom portions from alignment with said earth's magnetic field, and means for detecting the magnetic field produced by said precessing atom portions in said earth's magnetic field after termination of said applied alternating magnetic field.

11. The method for producing precessions of atom portions possessing the properties of magnetic moment and gyroscopic moment in the earth's magnetic field in which said atom portions are located which comprises the steps of applying a polarizing magnetic field to said atom portions to thereby align said atom portions in the direction of said earth's magnetic field, thereafter removing said polarizing magnetic field to leave said atom portions aligned in the earth's magnetic field, applying an alternating magnetic field to said aligned atom portions substantially of the Larmor frequency of said atom portions in said earth's magnetic field at an angle to the direction of said earth's magnetic field and of sufficient time duration to rotate said atom portions from alignment with the earth's magnetic field, terminating said alternating magnetic field, and detecting the magnetic field produced by said precessing atom portions in said earth's magnetic field after termination of said applied alternating magnetic field.

References Cited in the file of this patent

UNITED STATES PATENTS

| Re. 23,769 | Varian | Jan. 12, 1954 |
| 2,705,790 | Hahn | Apr. 5, 1955 |
| 2,721,970 | Levinthal | Oct. 25, 1955 |

FOREIGN PATENTS

| 746,114 | Great Britain | Mar. 7, 1956 |

OTHER REFERENCES

Bloom et al.: Physical Review, vol. 94, No. 6, March 1955, pp. 1699 to 1709.

Hahn: Physics Today, No. 1953, pp. 4–9.

Bloom et al.: Physical Review, vol. 93, No. 4, Feb. 15, 1954, page 941, article A8.

Brown: Physical Review, vol. 78, No. 5, June 1, 1950, pages 530–532.